United States Patent
Fan et al.

(10) Patent No.: US 7,274,537 B2
(45) Date of Patent: Sep. 25, 2007

(54) WINDAGE STRIPPER FOR AN ACTUATOR AND ROTATING DISC

(75) Inventors: Yaling Fan, Shakopee, MN (US); Brent Melvin Weichelt, Burnsville, MN (US); Colin Presly, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 375 days.

(21) Appl. No.: 10/873,932

(22) Filed: Jun. 22, 2004

(65) Prior Publication Data

US 2005/0280947 A1 Dec. 22, 2005

(51) Int. Cl.
*G11B 5/55* (2006.01)
(52) U.S. Cl. .................................................. 360/265.7
(58) Field of Classification Search ............. 360/265.7, 360/265.9
See application file for complete search history.

(56) References Cited

U.S. PATENT DOCUMENTS

| | | | |
|---|---|---|---|
| 4,189,759 A * | 2/1980 | Bauck et al. ............. | 360/244.9 |
| 4,352,133 A | 9/1982 | Hager | |
| 4,473,855 A | 9/1984 | Plotto et al. | |
| 4,703,379 A | 10/1987 | Bogdanski | |
| 4,879,618 A | 11/1989 | Iida et al. | |
| 5,134,530 A | 7/1992 | Hall | |
| 5,189,574 A | 2/1993 | Imamura et al. | |
| 5,517,372 A | 5/1996 | Shibuya et al. | |
| 5,541,791 A | 7/1996 | Yamasaki et al. | |
| 5,631,787 A | 5/1997 | Huang et al. | |
| 5,825,576 A | 10/1998 | Kamerbeek | |
| 5,854,725 A * | 12/1998 | Lee ............................ | 360/266 |
| 5,999,372 A * | 12/1999 | Peterson et al. ......... | 360/265.9 |
| 6,091,570 A | 7/2000 | Hendriks | |
| 6,097,568 A | 8/2000 | Ekhoff | |
| 6,366,432 B1 * | 4/2002 | Tadepalli et al. ........... | 360/266 |
| 6,473,271 B1 * | 10/2002 | Rahman et al. ............. | 360/266 |
| 6,542,328 B2 | 4/2003 | Harrison et al. | |
| 6,549,365 B1 | 4/2003 | Severson | |
| 6,570,742 B2 | 5/2003 | Korkowski et al. | |
| 6,600,625 B1 | 7/2003 | Munninghoff et al. | |
| 6,624,966 B1 | 9/2003 | Ou-Yang et al. | |
| 6,700,736 B1 | 3/2004 | Wu et al. | |
| 6,710,977 B2 * | 3/2004 | Tadepalli et al. ......... | 360/244.2 |
| 6,950,286 B2 * | 9/2005 | Huynh .................... | 360/265.9 |
| 7,054,103 B2 * | 5/2006 | Tadepalli et al. ......... | 360/97.02 |
| 2002/0075591 A1 | 6/2002 | Chang et al. | |

(Continued)

OTHER PUBLICATIONS

U.S. Appl. No. 10/768,595, filed Jan. 30, 2004, Fan et al.

*Primary Examiner*—William Korzuch
*Assistant Examiner*—Mark Blouin
(74) *Attorney, Agent, or Firm*—Fellers, Snider, et al.

(57) ABSTRACT

An actuator with a moveable block and supporting a cantilevered arm has a windage stripper supported for movement in unison with the block and spanning a cantilevered length of the arm. The actuator has a load member connected to the arm and supports a data head at a cantilevered end, wherein the stripper comprises a vane terminating at a distal end beyond the cantilevered end. A method including moving a data storage medium creating windage adjacent to an actuator supporting a data head at a cantilevered end, and supporting a windage stripper comprising a vane at the cantilevered end for movement in unison with the actuator in shielding the cantilevered end from windage-induced excitation.

5 Claims, 10 Drawing Sheets

U.S. PATENT DOCUMENTS

2002/0097525 A1   7/2002   Rao et al.
2003/0147175 A1   8/2003   Tadepalli et al.
2003/0214748 A1   11/2003   Fioravanti \* cited by examiner

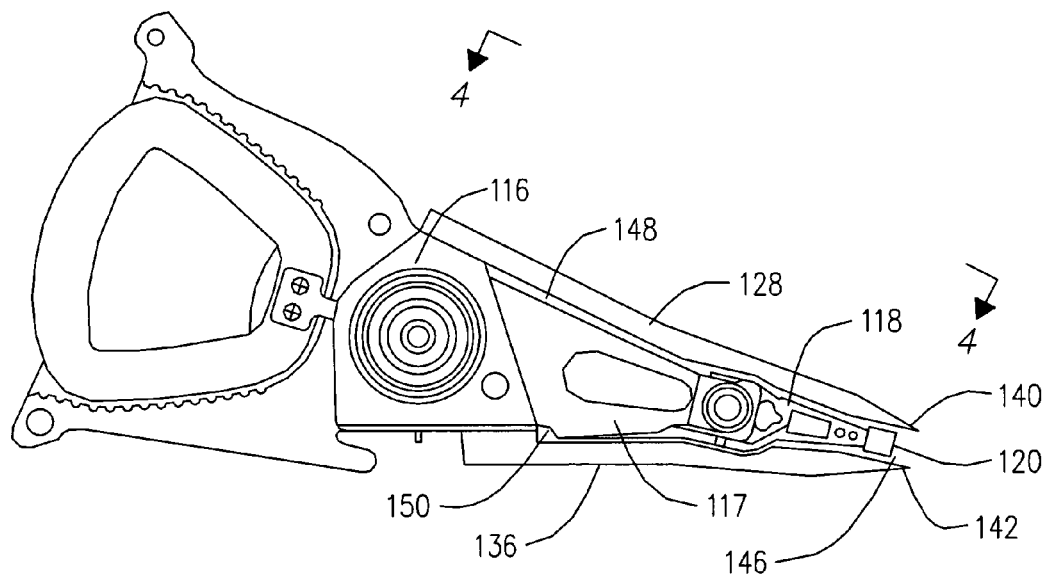
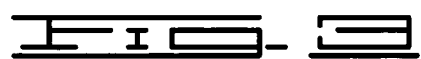
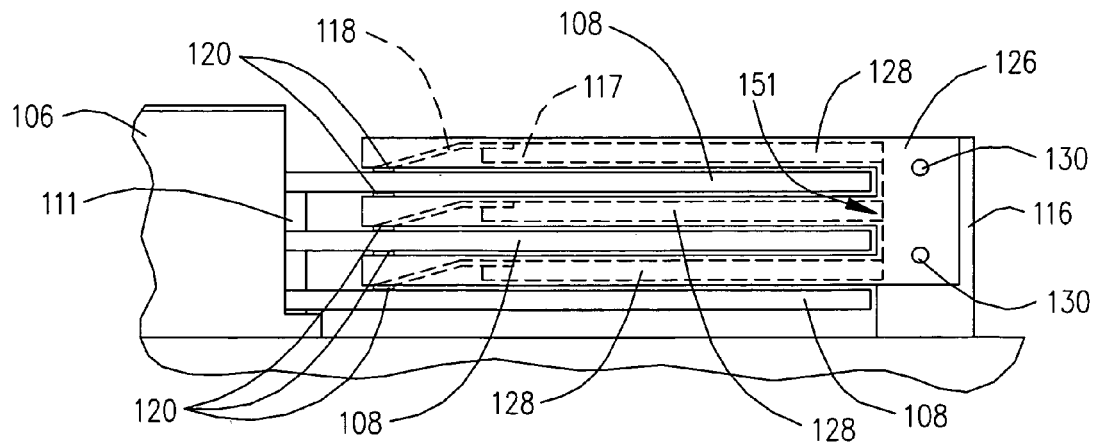
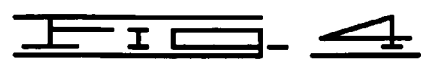

WINDAGE STRIPPER FOR AN ACTUATOR AND ROTATING DISC

FIELD OF THE INVENTION

The embodiments of the present invention relate generally to the field of data writing systems and more particularly without limitation to windage management for reducing fluid flow excitation of data writing components.

BACKGROUND

Modern data storage devices such as disc drives are commonly used in a multitude of computer environments to store large amounts of data in a form that is readily available to a user. Generally, a disc drive has a magnetic disc, or two or more stacked magnetic discs, that are rotated by a motor at high speeds. Each disc has a data storage surface divided into data tracks where data is stored in the form of magnetic flux transitions.

A data transfer member such as a magnetic transducer is moved by an actuator to selected positions adjacent the data storage surface to sense the magnetic flux transitions in reading data from the disc, and to transmit electrical signals to induce the magnetic flux transitions in writing data to the disc. The active elements of the data transfer member are supported by suspension structures extending from the actuator. The active elements are maintained a small distance from the data storage surface by a fluid bearing generated by fluid currents caused by the spinning discs. The term "fluid bearing" is synonymous with the widely used term "air bearing" where the fluid utilized in the disc drive is air. Alternatively, the term "fluid bearing" is applicable to other embodiments utilizing a fluid other than air, such as helium.

A continuing trend in the data storage industry is toward ever-increasing the data storage capacity and the processing speed while maintaining or reducing the physical size of the disc drive. Consequently, the data transfer member and the supporting structures are continually being miniaturized, and data storage densities are continually being increased. One result is an overall increased sensitivity to vibration as a percentage of track width.

One source of vibration comes from the fluid currents, or windage, that is created by the spinning discs. Fluid flow perturbations, and especially turbulent fluid flow, can excite the actuator and/or the disc creating vibrations. During servo track writing operations, for example, such vibrations can create actuator positional control errors, or transducer positional "wander," resulting in irregular servo track formatting such as but not limited to track squeeze.

While various proposed solutions have been found operable, there remains a continued need for improvements in windage management for attenuating excitation energy. It is to such improvements that the claimed invention is generally directed.

SUMMARY OF THE INVENTION

In accordance with preferred embodiments, an apparatus and method are provided for managing windage in a data writing device for attenuating excitation energy.

In some embodiments an actuator is provided comprising a moveable block supporting a cantilevered arm, and a windage stripper supported for movement in unison with the block and spanning a cantilevered length of the arm. The actuator has a load member connected to the arm and supports a data head at a cantilevered end, wherein the stripper comprises a vane terminating at a distal end beyond the cantilevered end.

In some embodiments a method is provided, comprising moving a data storage medium to create windage adjacent to an actuator supporting a data head at a cantilevered end, and supporting a windage stripper comprising a vane at the cantilevered end for movement in unison with the actuator in shielding the cantilevered end from windage-induced excitation.

In some embodiments a data writing device is provided, comprising a rotatable data storage disc in a data transfer relationship with an actuator, and means for shielding the actuator from windage-induced excitation.

These and various other features and advantages which characterize the claimed invention will become apparent upon reading the following detailed description and upon reviewing the associated drawings.

BRIEF DESCRIPTION OF THE DRAWINGS

FIG. 3 is a plan view of the actuator of FIG. 1.

FIG. 4 is an elevational view of the stripper and discs of FIG. 1.

DETAILED DESCRIPTION

Figure 1:
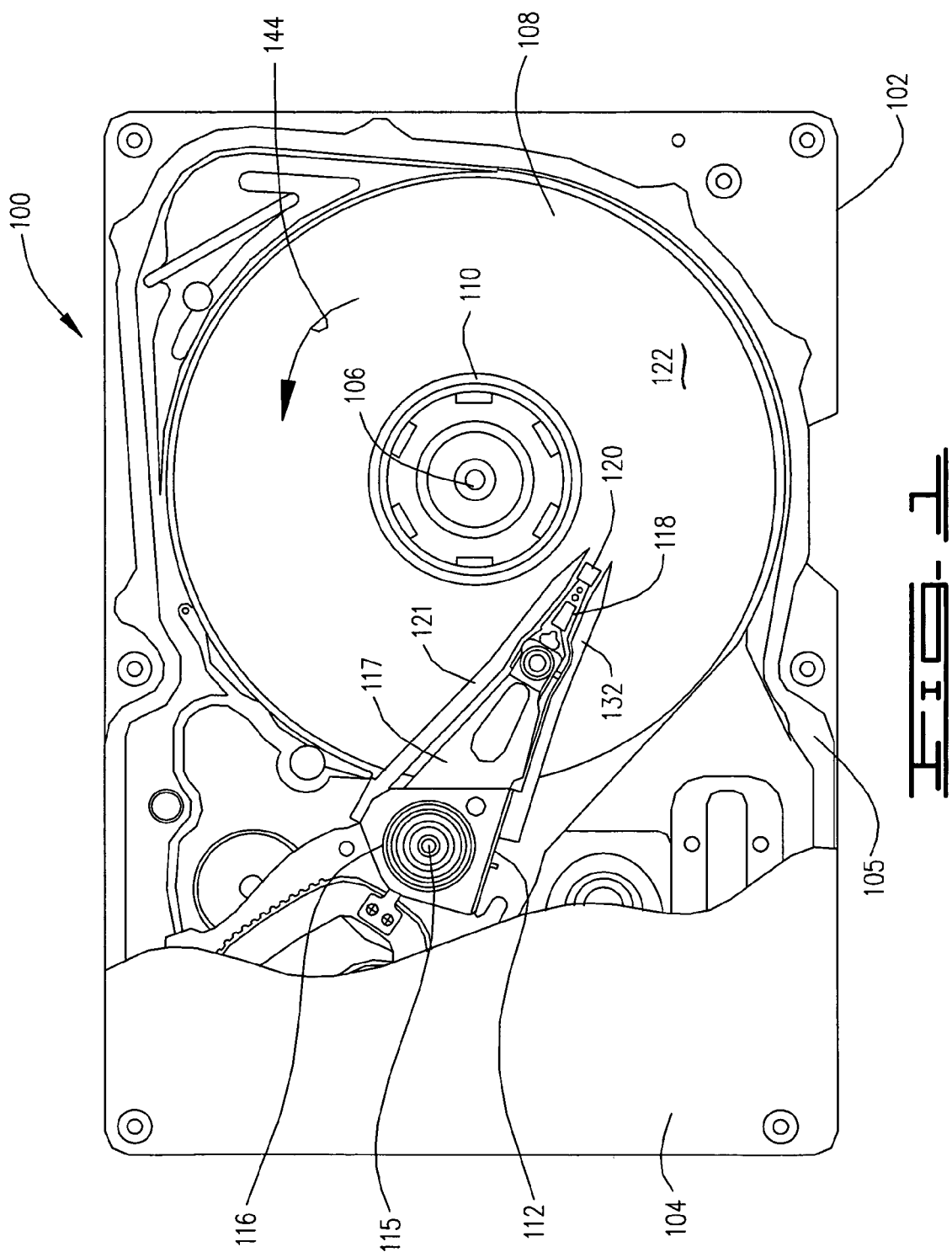
FIG. 1 is a plan view of a data storage device constructed in accordance with embodiments of the present invention.
Figure 2:
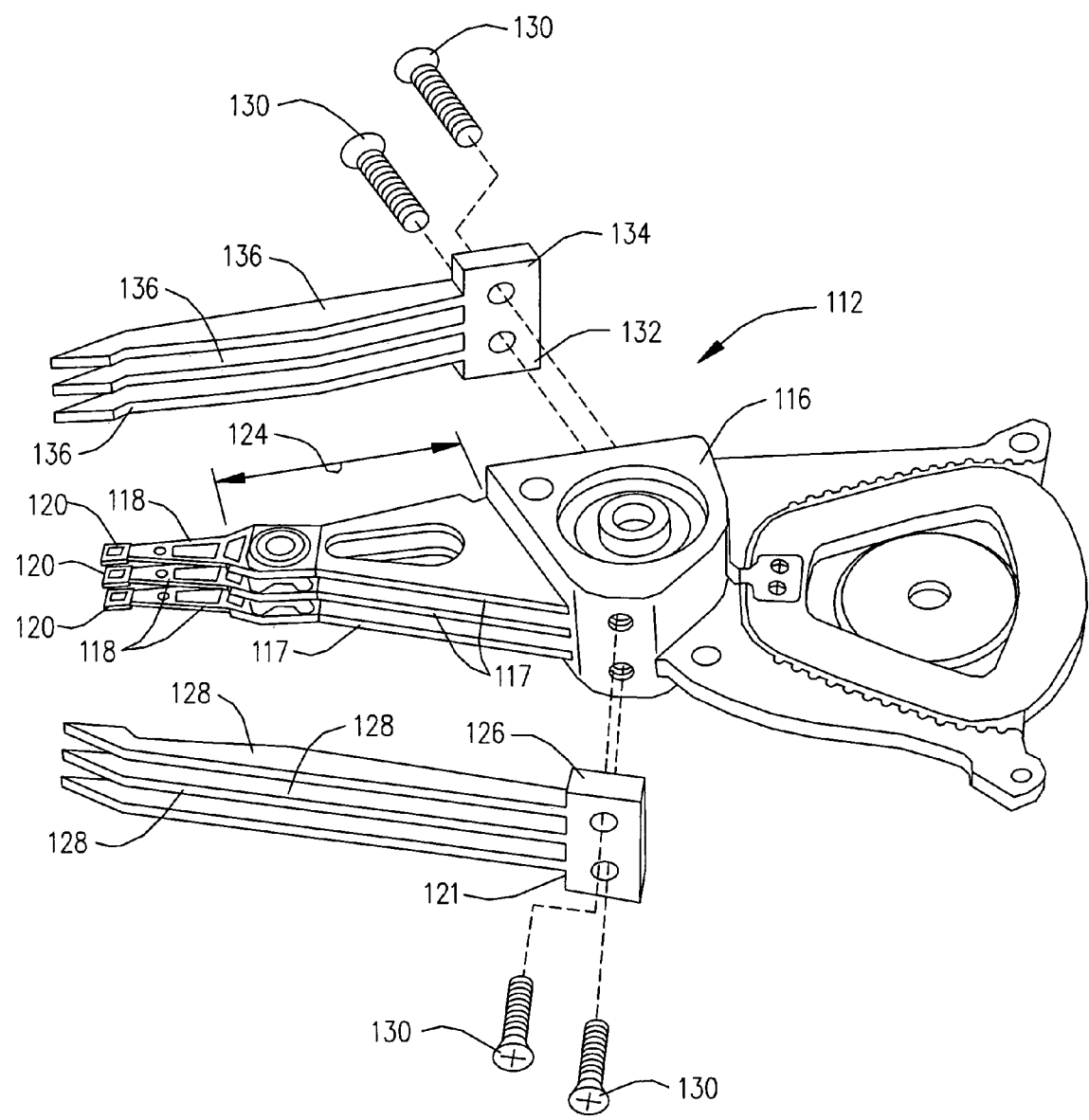
FIG. 2 is an isometric exploded view of the actuator of the data storage device of FIG. 1.

Referring to the drawings in general, and more particularly to FIGS. 1 and 2, shown therein is a data storage device 100 that is constructed in accordance with embodiments of the present invention. The data storage device 100 includes a base 102 to which various disc drive components are mounted, and a cover 104 (partially cutaway) which together with the base 102 and a perimeter gasket 105 form an enclosure providing a sealed internal environment for the data storage device 100.

Mounted to the base 102 is a motor 106 to which one or more discs 108 are stacked and secured by a clamp ring 110 for rotation at a high speed. Where a plurality of discs 108 are stacked to form a disc stack, adjacent discs 108 are typically separated by a disc spacer 111 (FIG. 4). An actuator 112 pivots around a pivot bearing 115 in a plane parallel to the discs 108. The actuator 112 has a moveable block 116, sometimes referred to as an "e-block," and cantilevered arms 117 extending therefrom. Each arm 117 supports load arms 118 in travel across the discs 108. The load arms 118 are flex members that support data transfer members, such as data heads 120, with each of the heads 120 operationally interfacing a surface of one of the discs 108 in a data reading and writing relationship. This relationship is maintained by a slider (not shown) which operably supports the head 120 on a fluid bearing sustained by fluid currents generated by the spinning discs 108. In some embodiments the fluid can be air; in other embodiments the fluid can be something other than air such as but not limited to helium.

Each of the discs 108 has a data storage region comprising a data recording surface 122. In some embodiments the head 120 is used to write servo information defining the track location; this is referred to as "in-situ" servo track writing. In other embodiments the servo information is prewritten to the discs 108 before they are installed into the data storage device 100; this is referred to as "ex-situ" servo track writing and is discussed below. The data tracks can be defined in various arrangements, such as being concentric or spiraled. In addition to in-situ servo track writing, the heads 120 are subsequently positioned adjacent a desired data track, from servo information feedback, in reading data from and writing data to the data storage surface 122. Accordingly, the data storage device 100 is sometimes referred to as a data writing device or a data reading device.

As noted earlier, the motor 106 spins the discs 108 at a high speed while the head 120 writes and/or reads to/from the data storage surface 122. The kinetic energy of the spinning discs 108 is transferred by friction to the fluid at the disc/fluid boundary layer, thereby imparting a force vector to the fluid. The combined rotational and centrifugal forces from the spinning discs 108 creates a generally outwardly spiraling fluid flow pattern to the fluid surrounding the discs 108. By practicing embodiments of the present invention, this fluid flow, or windage, can be attenuated to reduce excitation energy on the actuator 112 and the disc 108 to a level below an acceptable threshold level.

In the illustrative embodiments of FIG. 1, the direction of disc 108 rotation is indicated by reference number 144. The actuator 112 has an upstream windage stripper 121, with respect to the windage direction established by the direction of rotation 144, that is supported for movement in unison with the block 116 and spans a cantilevered length 124 of the arms 117. The stripper 121 has a proximal end 126 that is attachable to the block 116 of the actuator 112, and a number of vanes 128, corresponding to the number of arms 117 of the actuator 112, extending from the proximal end 126. In the illustrative embodiments of FIG. 2 the stripper 121 is attached by mechanical fasteners 130; alternatively, the stripper 121 can be attached by other fastening means including but not limited to bonding, welding, or overmolding, or in equivalent alternative embodiments the stripper 121 can be unitarily formed as a portion of the body 116 of the actuator 112.

The actuator 112 also has a downstream windage stripper 132 that is likewise supported for movement in unison with the block 116 and spans the cantilevered length 124 of the arms 117. The stripper 132 has a proximal end 134 that is attachable to the block 116 of the actuator 112, and a number of vanes 136, corresponding to the number of arms 117 of the actuator 112, extending from the proximal end 134. The stripper 132 can be attached as described above. In alternative equivalent embodiments the upstream and downstream strippers 126, 132 can be unitarily formed, or in other words formed as a single component, and together attached to the body 116 of the actuator 112. In other alternative equivalent embodiments both strippers 126, 132 can be unitarily formed as a portion of the body 116 of the actuator 112.

As best illustrated in FIG. 3, the vanes 128, 136 terminate at distal ends thereof 140, 142, respectively, beyond a cantilevered end 146 of the load beam 118 in order to shield the arms 117, the load beams 118, and the heads 120 from windage-induced excitation. By attaching the vanes 128, 136 to the body 116, or forming them as portion thereof, and providing gaps 148, 150 between the vanes 128, 136 and the rest of the actuator 112, then any windage-induced excitation of the vanes 128, 136 is not directly transmitted to the arms 117, the load beams 118, or the heads 120. The vanes 128, 136 can have tapered end portions adjacent the distal ends 140, 142 to eliminate turbulence created by shedding vortices downstream of the vanes 128, 136.

As discussed above, the strippers 121, 132 comprise a number of vanes 128, 136 associated with the number of arms 117. As best illustrated in FIG. 4, the vanes 128 are disposed substantially parallel with the arms 117 and sized to substantially fill the gaps 151 formed between adjacent discs 108 in a disc stack. The vanes 128, 136 are also preferably provided adjacent the outermost disc surfaces and sized to divert the windage from the actuator 112.

Figure 5:
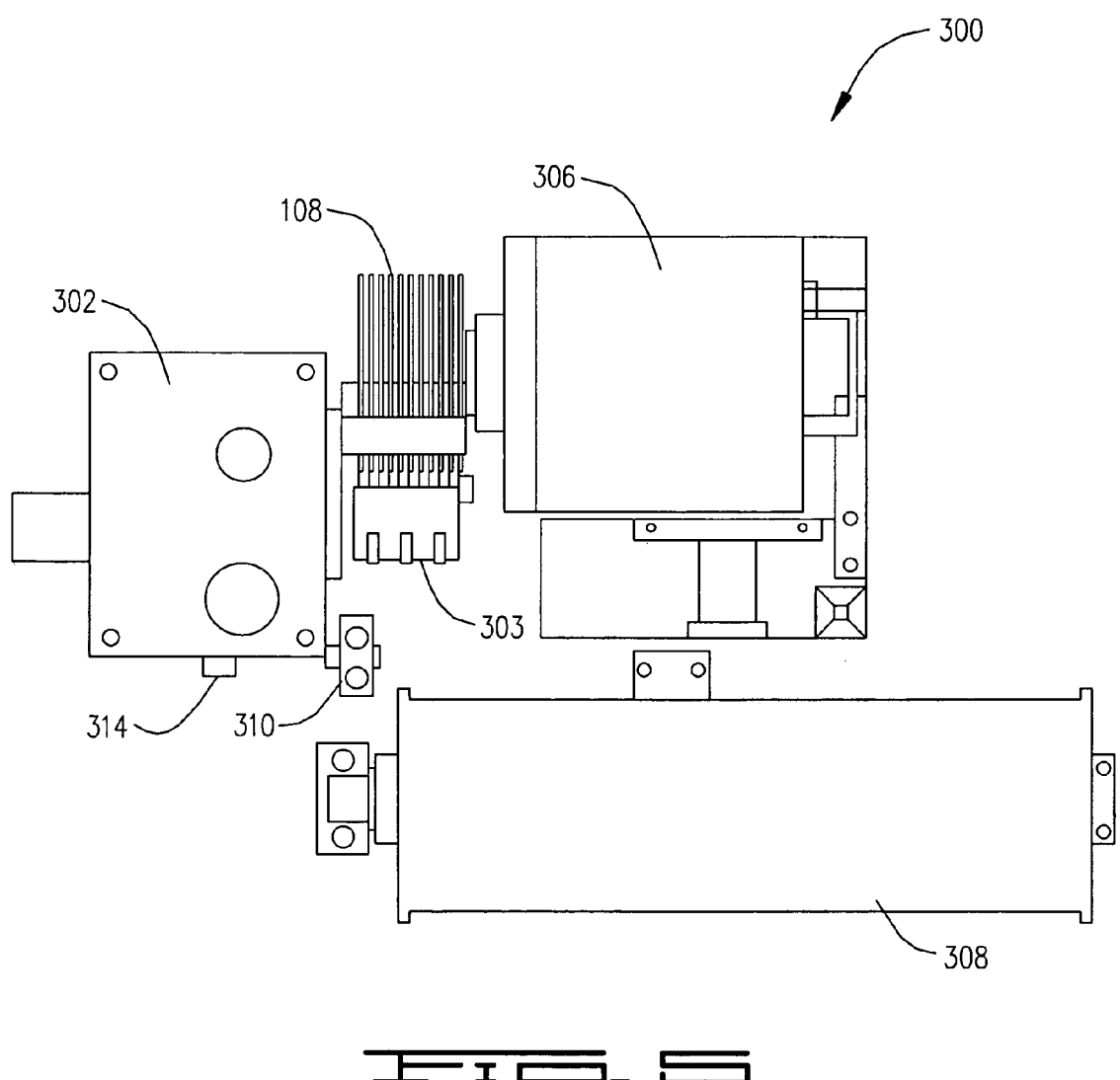
FIG. 5 is a plan view of an ex-situ servo track writer constructed in accordance with embodiments of the present invention.
Figure 6:
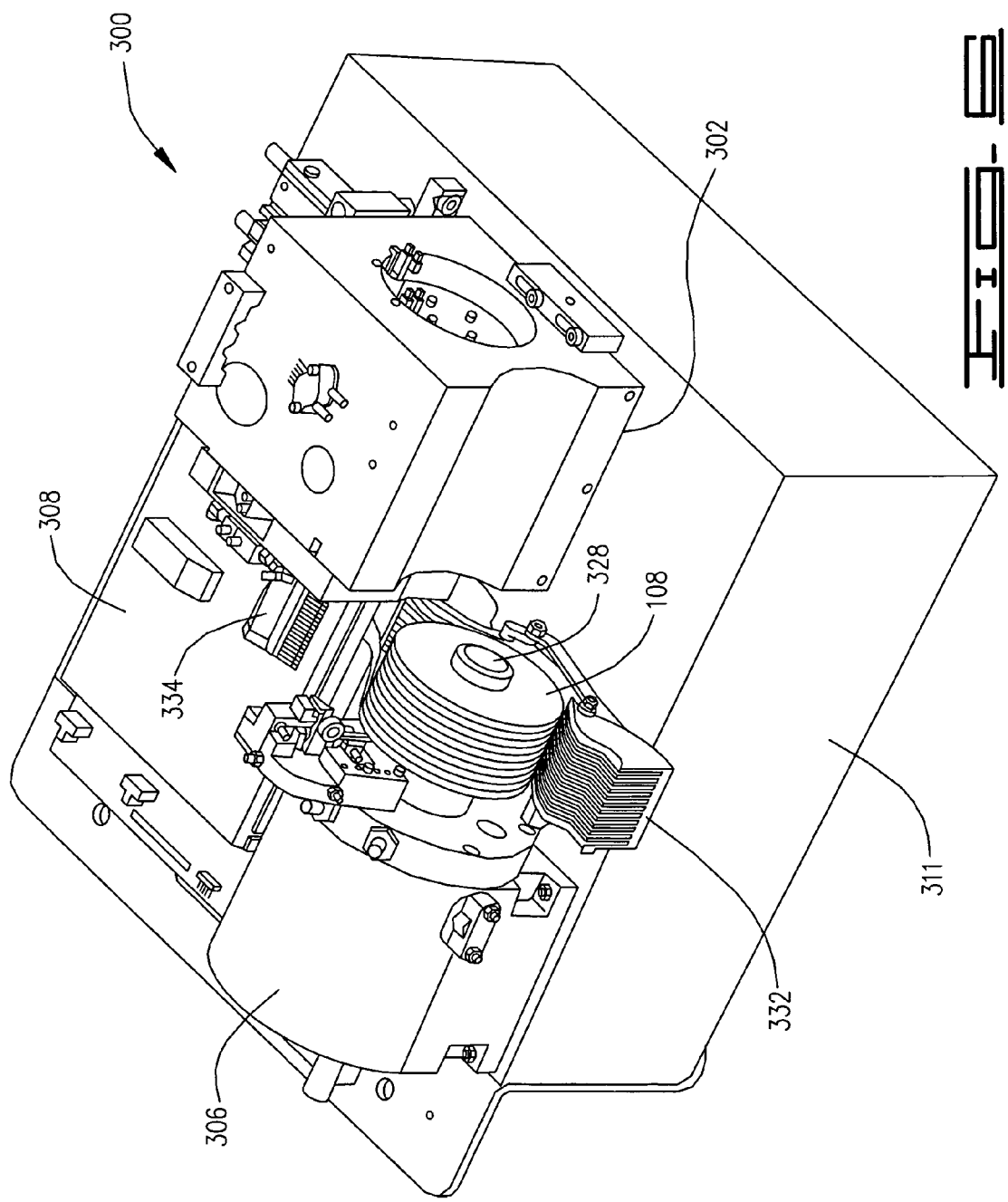
FIG. 6 is an isometric view of the servo track writer of FIG. 5.
Figure 7:
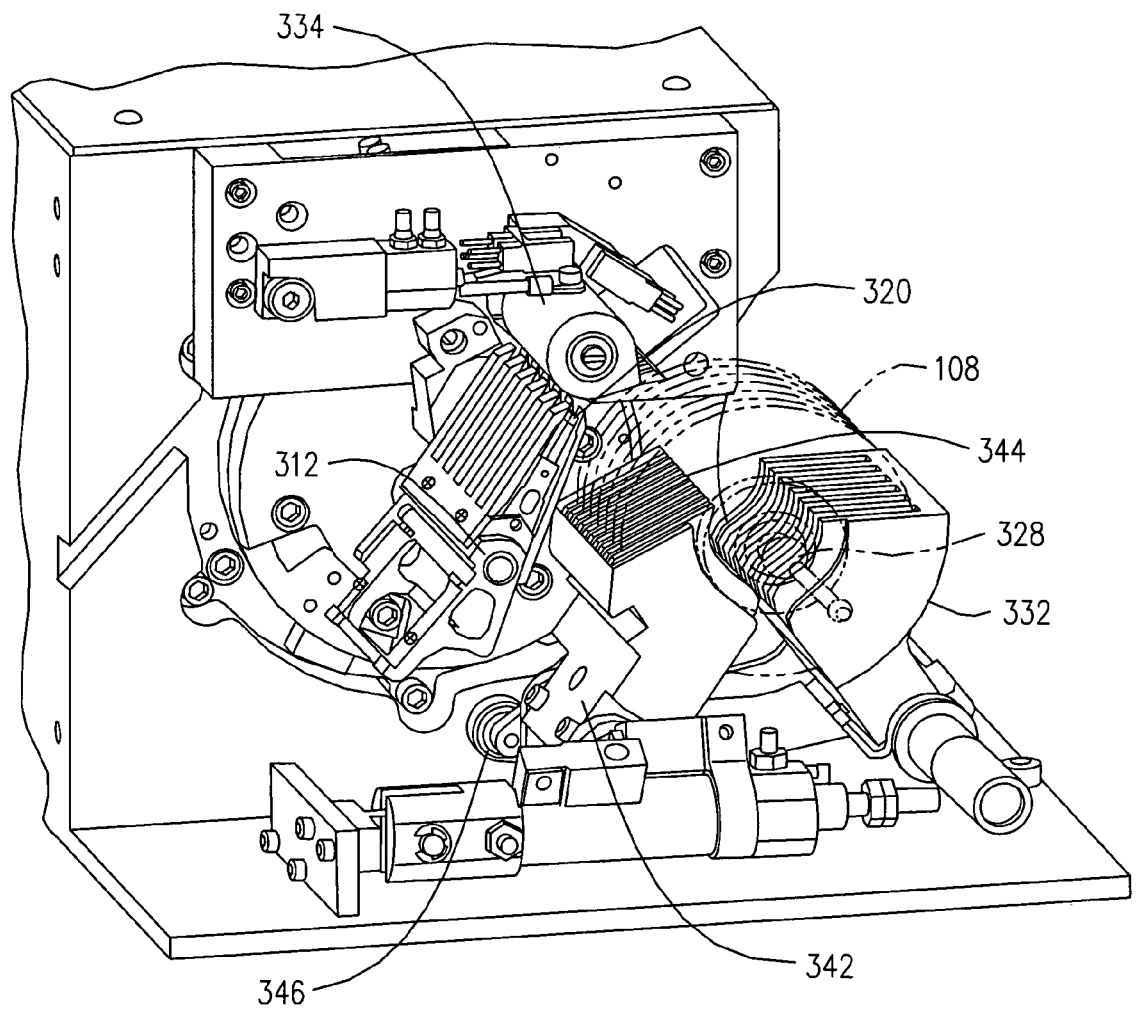
FIG. 7 is an enlarged isometric view of a portion of the servo track writer of FIG. 5.

Turning now to FIGS. 5-7, embodiments of the present invention are now addressed with regard to an ex-situ servo track writing device 300 that is used to write servo data information to a multi-disc stack of discs 108. The device 300 includes an actuator assembly 302 for positioning an actuator 312 supporting servo recording heads 320 at a distal end thereof for recording the servo information. A motor hub assembly 306 rotationally presents the discs 108 to the recording heads 320. A vacuum chuck 308 secures the actuator assembly 302 between a servo writing position, shown in FIG. 7, and a retracted position where the multi-disc stacks are loaded and unloaded, shown in FIG. 6. A laser interferometer 310 provides position control for the angular displacement of the servo recording heads 304.

A base 311, such as a granite slab, supports the device 300 components. A linear slide 314 defines a constrained lateral movement for the actuator assembly 302 between the servo writing and the load/unload positions. With the actuator assembly 302 in the load/unload position (FIG. 6) a spindle hub 328 supporting the plurality of discs 108 is loaded to the motor 306. A fluid flow dam 332 is then articulated to partially enclose the plurality of discs 108. The actuator assembly 302 is then moved laterally by the slide 314 into operable engagement with the multi-disc stack. A comb 334 pivots to clearingly engage the plurality of servo recording heads 320 with the respective discs 108 so that the actuator 312 can be loaded to the multi-disc stack. With the actuator 312 loaded, the motor 306 spins the multi-disc stack and servo track writing begins.

Figure 8:
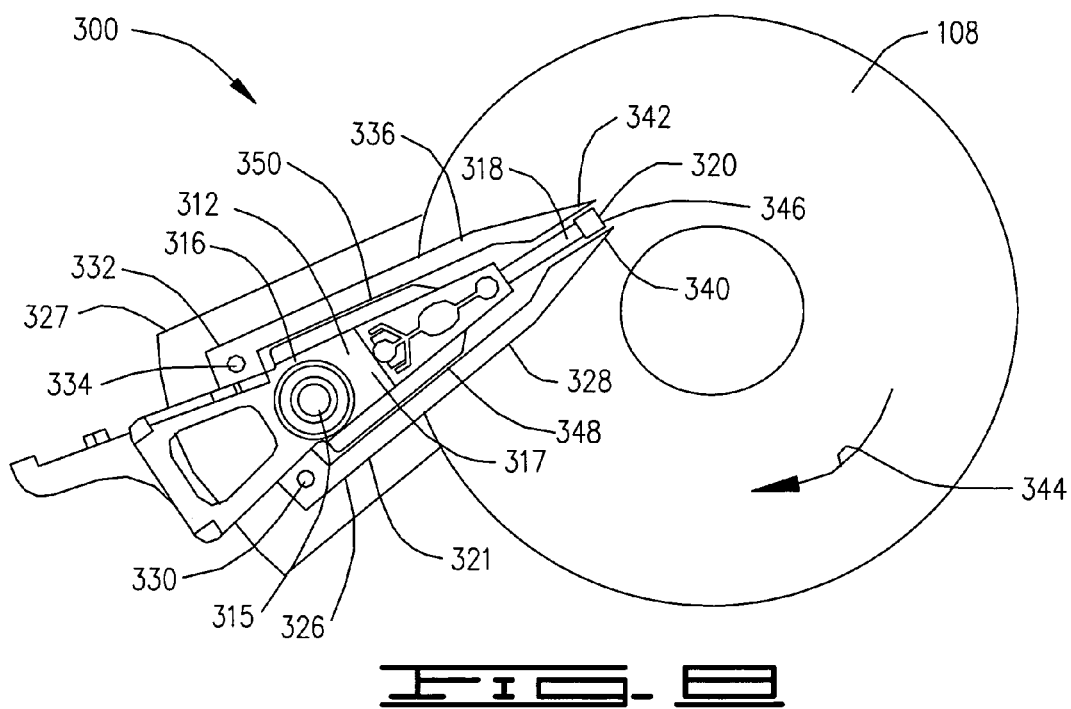
FIG. 8 is an elevational view of a portion of the servo track writer of FIG. 5.

As best illustrated in FIG. 8, the discs 108 spin in direction 344 creating windage. The actuator 312 pivots around a pivot bearing 315 in a plane parallel to the discs 108. The actuator 312 has a moveable block 316 and cantilevered arms 317 extending therefrom. Each arm 317 supports load arms 318 in travel across the disc. The load arms 318 are flex arms that support data transfer members, such as data heads 320, with each of the heads 320 operationally interfacing with a surface of one of the discs 108 in a servo information writing relationship with the disc 108. This writing relationship is maintained by a slider (not shown) which operably supports the head 320 on a fluid bearing sustained by fluid currents generated by the spinning discs 108. In some embodiments the fluid can be air; in other embodiments the fluid can be something other than air such as but not limited to helium.

As above, the motor 306 spins the discs 108 at a high speed while the head 320 writes servo information to the discs 108. The kinetic energy of the spinning discs 108 is transferred by friction to the fluid at the disc/fluid boundary layer, thereby imparting a force vector to the fluid. The combined rotational and centrifugal forces from the spinning discs 108 creates a generally outwardly spiraling windage pattern to the fluid surrounding the discs 108. Windage-induced excitation can be attenuated by practicing embodiments of the present invention.

In the embodiments illustrated by FIG. 8, the actuator 312 has an upstream windage stripper 321, with respect to the windage direction 344, that is supported for movement in unison with the block 316 and spans a cantilevered length of the arms 317. In some embodiments the stripper 321 has proximal end 326 that is attachable to the block 316 of the actuator 312. Alternatively, the actuator 312 can be supported by a rotatable plate 327, and the stripper 321 can be likewise attached to the plate 327, such as with fastener 330, for movement in unison with the actuator 312. Alternatively, as above, the stripper 321 can be attached by other fastening means including but not limited to bonding, welding, or overmolding, or in equivalent alternative embodiments the stripper 321 can be unitarily formed as a portion of the block 316 of the actuator 312 or as a portion of the plate 327. The stripper 321 also has a number of vanes 328, corresponding to the number of arms 317 of the actuator 312, extending from the proximal end 326.

The actuator 312 also has a downstream windage stripper 332 that is likewise supported for movement in unison with the block 316 and spans the cantilevered length of the arms 317. The stripper 332 has a proximal end 334 that can be attachable to the block 316 of the actuator 312, and a number of vanes 336, corresponding to the number of arms 317 of the actuator 312, extending from the proximal end 334. Alternatively, the stripper 332 can be supported by the plate 327. The stripper 332 can be attached as described above. In alternative equivalent embodiments the upstream and downstream strippers 326, 332 can be unitarily formed, or in other words formed as a single component, and together attached to the body 316 of the actuator 312 or to the plate 327. In other alternative equivalent embodiments both strippers 326, 332 can be unitarily formed as a portion of the body 316 of the actuator 312 or as a portion of the plate 327.

The vanes 328, 336 terminate at distal ends 340, 342, respectively, beyond a cantilevered end 346 of the load bean 318 in order to shield the arms 317, the load beams 318, and the heads 320 from windage-induced excitation. By attaching the vanes 328, 336 for movement with the body 316, and providing gaps 348, 350 between the vanes 328, 336 and the rest of the actuator 312, then any windage-induced excitation of the vanes 328, 336 is not directly transmitted to the arms 317, the load beams 318, or the heads 320. The vanes 328, 336 can have tapered end portions adjacent the distal ends 340, 342 to eliminate turbulence created by shedding vortices downstream of the vanes 328, 336.

As discussed above, the strippers 321, 332 comprise a number of vanes 328, 336 associated with the number of arms 317. As discussed above, the vanes 328, 336 are disposed substantially parallel with the arms 317 and sized to substantially fill the gaps formed between adjacent discs 108 in a disc stack. The vanes 328, 336 are also preferably provided adjacent the outermost disc surfaces and sized to divert the windage away from the actuator 312.

Figure 9:
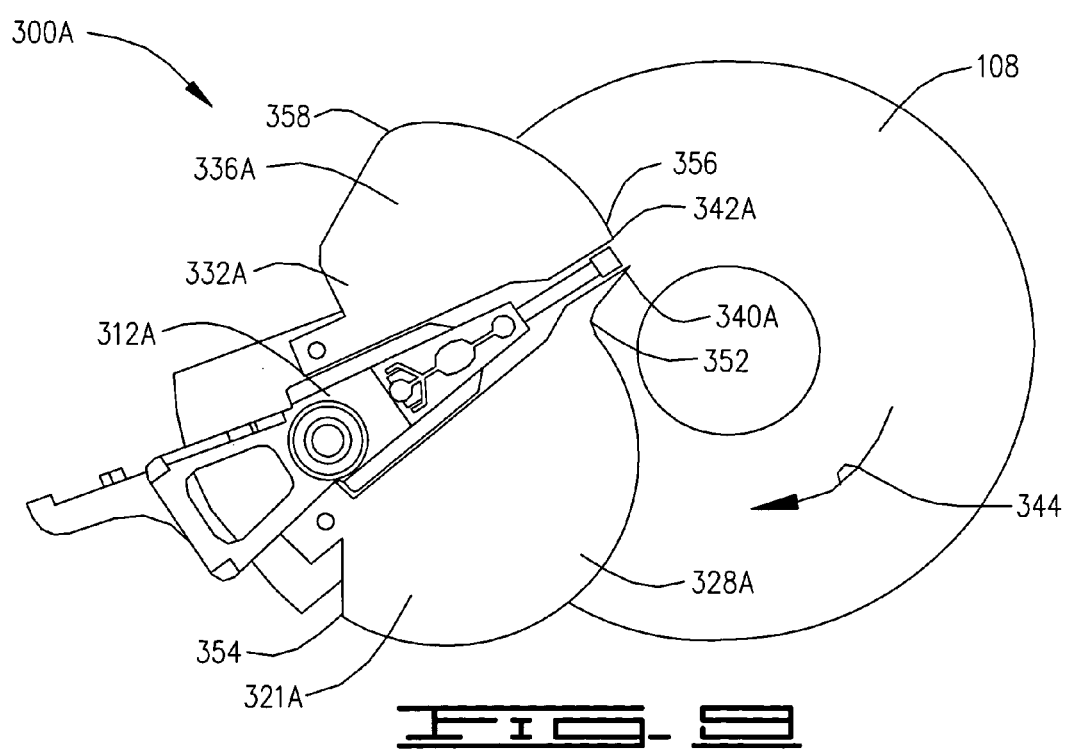
FIG. 9 is an elevational view of a portion of a servo track writer similar to FIG. 8 but constructed in accordance with alternative embodiments of the present invention.

FIG. 9 illustrates a portion of an ex-situ servo track writer 300A, similar to FIG. 8, but having an actuator 312A constructed in accordance with alternative embodiments of the present invention. The actuator 312A has an upstream stripper 321A, with respect to the direction of disc rotation 344, that is supported for movement with the actuator 312A as described above. However, the stripper 321A has a vane 328A that extends away from the actuator 312A from a portion 352 adjacent the distal end 340A to a portion 354 beyond an edge of the disc 108. The enlarged portion of the vane 328A laminarizes the fluid flow at the disc 108 edge adjacent the actuator 312A, thereby providing a disc 108 edge damper to further attenuate windage-induced excitation. The actuator 312A also has a downstream stripper 332A with a vane 336A that similarly extends away from the actuator 312A from a portion 356 adjacent the distal end 342A to a portion 358 beyond an edge of the disc 108. In this manner the downstream stripper 332A likewise defines a disc edge damper adjacent to the actuator 312A in order to attenuate windage-induced excitation.

Figure 10:
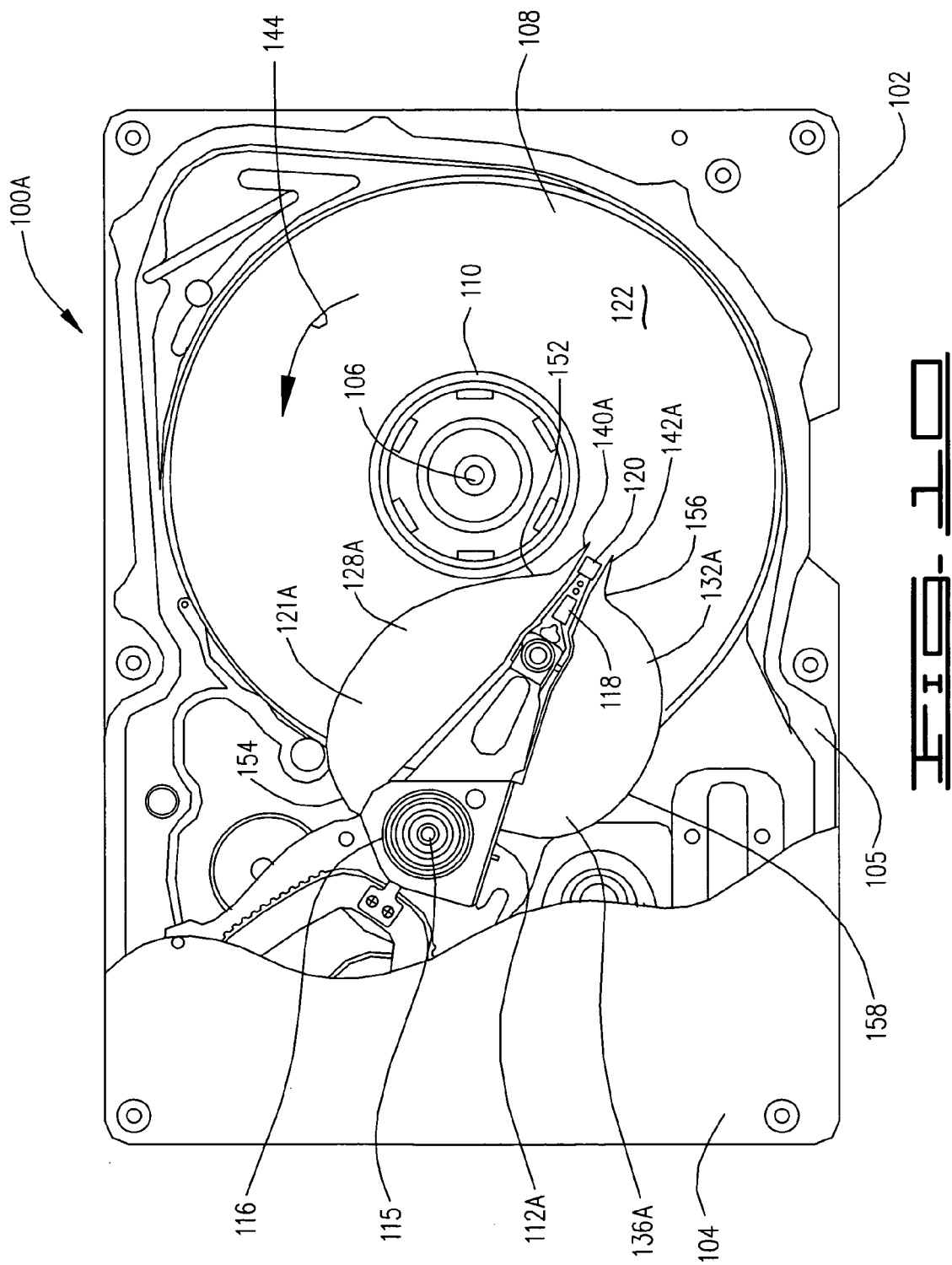
FIG. 10 is a plan view of a data storage device similar to FIG. 1 but constructed in accordance with alternative embodiments of the present invention.

FIG. 10 illustrates a data storage device 100A, similar to FIG. 1, but having an actuator 112A constructed in accordance with alternative embodiments of the present invention. The actuator 112A has an upstream stripper 121A, with respect to the disc 108 direction of rotation 144, that is supported for movement with the actuator 112A as above. However, the stripper 121A has a vane 128A that extends away from the actuator 112A from a portion 152 adjacent the distal end 140A to a portion 154 beyond the disc 108 edge. Similarly, the actuator 112A has a downstream stripper 132A with a vane 136A that extends away from the actuator 112A from a portion 156 adjacent the distal end 142A to a portion 158 beyond the disc 108 edge. The enlarged portions of the vanes 121A, 132A similarly laminarizes the fluid flow at the disc 108 edge adjacent to the actuator 112A, thereby providing a disc 108 edge damper to further attenuate windage-induced excitation.

Figure 11:
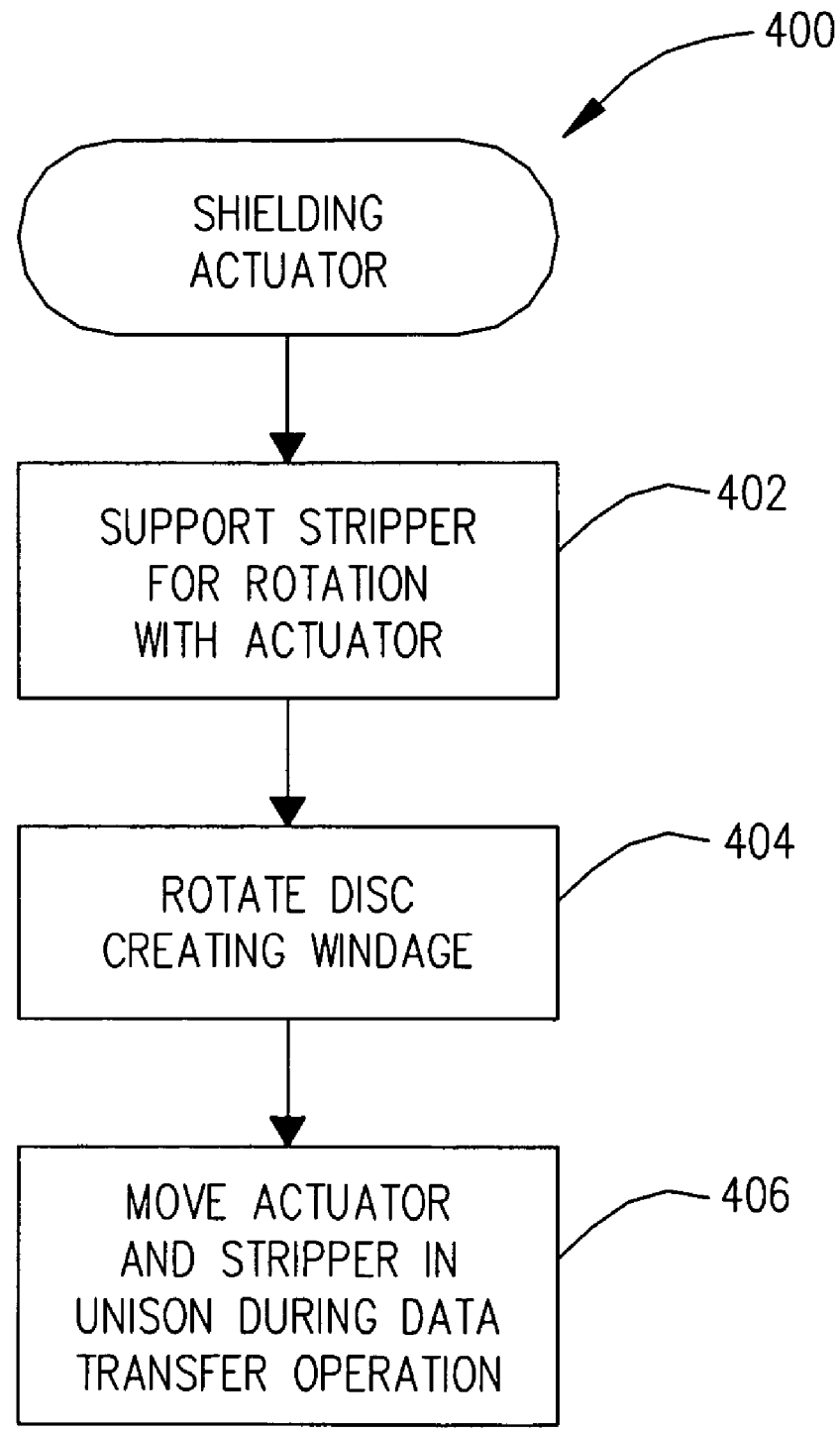
FIG. 11 is a block diagram illustrating steps for practicing a method in accordance with embodiments of the present invention.

FIG. 11 illustrates a method 400 of SHIELDING THE ACTUATOR illustrating steps for practicing the embodiments of the present invention. The method 400 includes supporting the stripper 121, 132, 321, 332 for rotation with the actuator 112, 312 in block 402. In block 404 the disc 108 is rotated, creating the windage addressed by the embodiments of the present invention. In block 406 the actuator 112, 312 is moved in unison with the stripper 121, 132, 321, 332 during data transfer operations, such as but not limited to the servo track writing operations discussed above, for shielding the arms 117, 317, the load beams 118, 318, and the heads 120, 320 from windage-induced excitation.

The supporting step 402 can comprise attaching a proximal end 126, 134, 326, 334 of the stripper 121, 321 to the block 116, 316 and isolating the vane 128, 136, 328, 336 from the cantilevered arm 117, 317. The supporting step 402 can further comprise supporting an upstream vane 128, 328 on one side of the actuator 112, 312 and a downstream vane 136, 336 on the other side of the actuator 112, 312, with respect to a windage direction 144, 344. Preferably, the supporting step 402 comprises supporting the vane 128, 136, 328, 336 and the arm 117, 317 in a substantially coplanar relationship.

In some embodiments the supporting step 402 comprises extending the vane 128A, 136A, 328A, 336A away from the actuator 112A, 312A from a portion 152, 156, 352, 356 adjacent the cantilevered end 140A, 142A, 340A, 342A to a portion 154, 158, 354, 358 beyond a disc 108 edge for damping the disc 108. Preferably, the supporting step 402 comprises supporting a plurality of vanes 121, 136, 321, 336 with one of the plurality of vanes disposed adjacent each of a plurality of cantilevered arms 117, 317. Also preferably, the supporting step 402 comprises tapering the vane 121, 136, 321, 336 at a portion adjacent the cantilevered end 140, 142, 340, 342.

Figure 12:
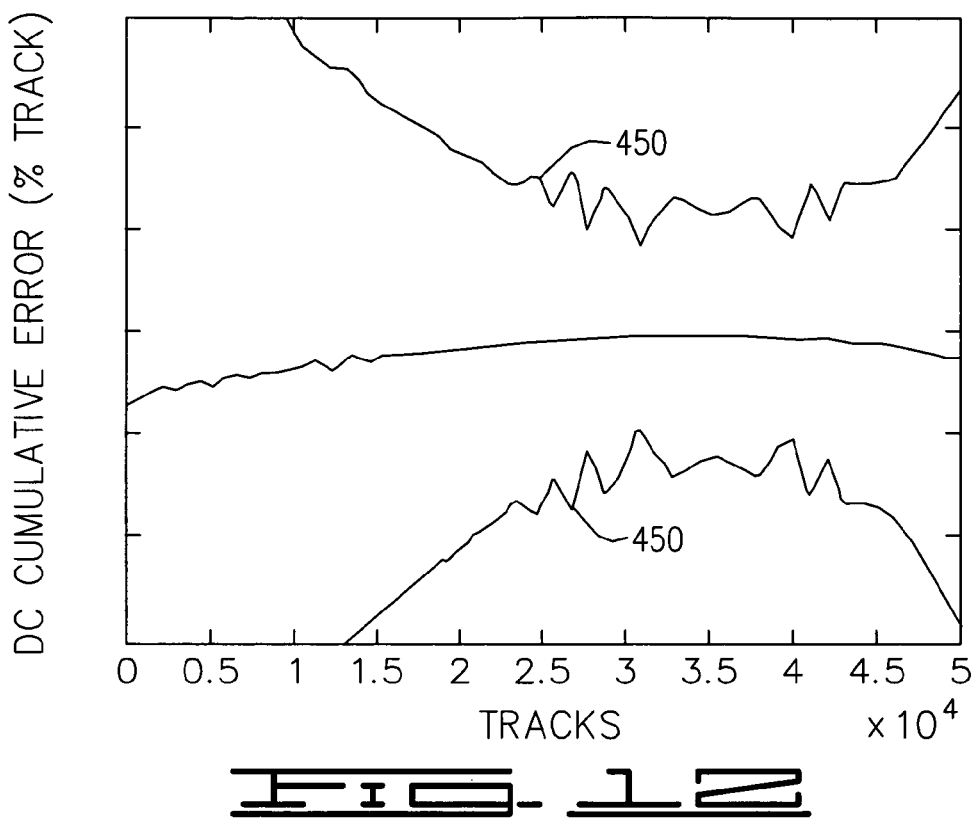
FIGS. 12 and 13 illustrate testing results for a servo track writer device outfitted both without and with, respectively, the strippers in accordance with embodiments of the present invention.
Figure 13:
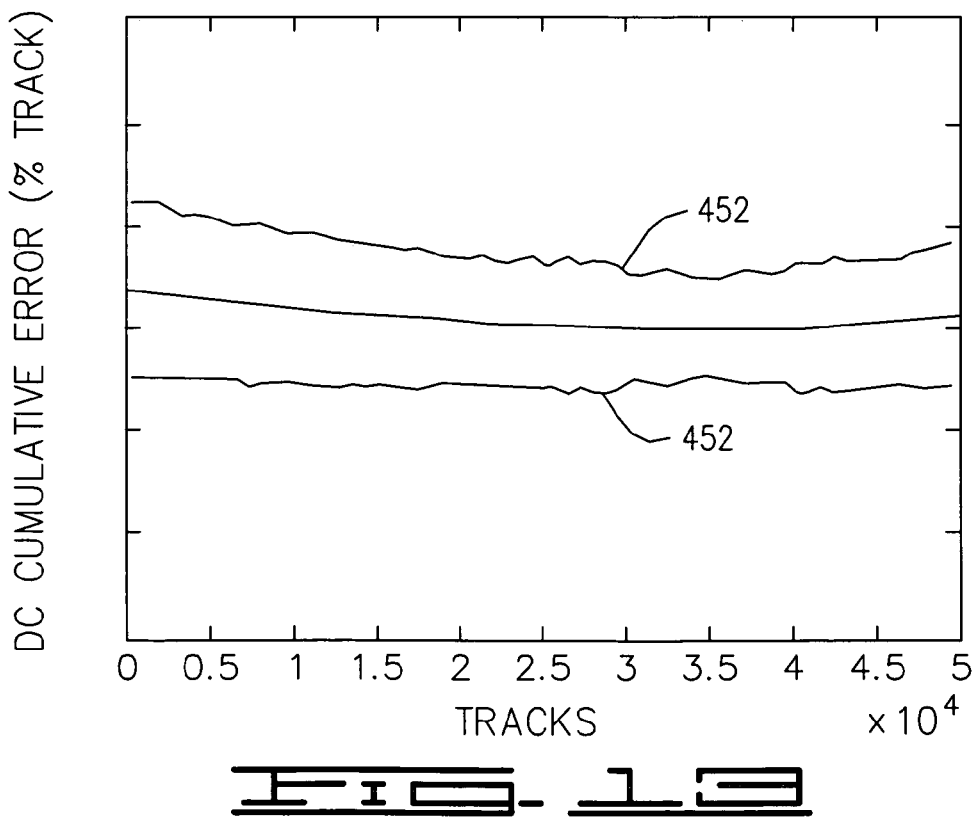

FIG. 12 illustrates results of testing the servo track writer 300 of FIGS. 5-8 without the strippers 321, 332 in place. Windage-induced excitation caused error, commonly referred to as "DC wander" 450 as a percentage of track width, was observed to increase as the head 320 skew angle increased. This observed DC wander magnitude was enough to predict a yield of less than 50% for the discs 108 having servo information written to them. FIG. 13 illustrates the results of the same testing but on a servo track writer 300 modified with the addition of the strippers 321, 332 in accordance with the embodiments of the present invention. The DC wander 452 was observed as being reduced by about 50%, bringing the predicted yield rate within an acceptable level.

Summarizing generally, an actuator (such as 112, 312) having a central block (such as 116, 316) supporting cantilevered arms (such as 117, 317) is provided with a windage stripper (such as 121, 132, 321, 332) that is supported for movement in unison with the block and spans a cantilevered length of the arm. The arm supports a load member (such as 118, 318) supporting, in turn, a data transfer head (such as 120, 320) at a cantilevered end. The stripper has a vane (such as 128, 136, 328, 336) terminating at a distal end thereof (140, 142, 340, 342) beyond the cantilevered end.

Preferably, the stripper comprises an upstream vane disposed on one side of the arm and a downstream vane disposed on an opposing side of the arm, with respect to a windage direction (such as 144, 344). The stripper can be supported at a proximal end (such as 126, 134, 326, 334) by the block so that the vane can be isolated from the cantilevered arm. In some embodiments the vane extends away from the actuator from a portion (such as 152, 156, 352, 356) adjacent the distal end to a portion (such as 154, 158, 354, 358) beyond a disc (such as 108) edge defining a disc edge damper adjacent the actuator. Where the discs are stacked in a disc stack, the stripper has a plurality of vanes, with one of the plurality of vanes disposed adjacent each of a plurality of cantilevered arms of the actuator. The vane distal end can be tapered to prevent shedding vortices downstream of the strippers.

In some embodiments a method (such as 400) is provided comprising moving a data storage medium creating windage (such as 404) adjacent to an actuator supporting a data head at a cantilevered end; and supporting a windage stripper (such as 402) comprising a vane at the cantilevered end for movement in unison with the actuator in shielding the cantilevered end from windage-induced excitation.

The supporting step can comprise attaching the proximal end of the stripper to the block and isolating the vane from the cantilevered arm. Preferably, the supporting step comprises supporting an upstream vane on one side of the actuator and a downstream vane on the other side of the actuator, with respect to a windage direction. The supporting step can comprise supporting the vane and the arm in a substantially coplanar relationship. In some embodiments the supporting step comprises extending the vane away from the actuator from a portion adjacent the cantilevered end to a portion beyond a disc edge for damping the disc. Where the disc is arranged with a plurality of discs in a disc stack, the supporting step comprises supporting a plurality of vanes, with one of the plurality of vanes disposed adjacent each of a plurality of cantilevered arms. In some embodiments the supporting step comprises tapering the vane at a portion adjacent the cantilevered end.

In some embodiments a data writing device is provided, comprising a rotatable data storage disc in a data transfer relationship with an actuator, and means for shielding the actuator from windage-induced excitation. In some embodiments the means for shielding is characterized by stripping windage away from the actuator with a stripper moving in unison with the actuator. Preferably, the means for shielding is characterized by isolating the stripper from an arm of the actuator supporting a read/write head. Also preferably, the means for shielding is characterized by stripping the windage on both the upstream and downstream sides of the actuator with respect to a windage direction. In some embodiments the means for shielding is characterized by damping the disc with the stripper.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular size or characteristic arrangement of a stripper without departing from the scope and spirit of the present invention. In addition, although the preferred embodiments described herein are directed to a data writing device, it will be appreciated by those skilled in the art that the teachings of the present invention can be applied to other systems without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A data writing device comprising:
   a rotatable data storage disc in a data transfer relationship with an actuator; and
   means for shielding the actuator from windage-induced excitation.

2. The device of claim 1 wherein the means for shielding is characterized by stripping windage away from the actuator with a stripper moving in unison with the actuator.

3. The device of claim 2 wherein the means for shielding is characterized by isolating the stripper from an arm of the actuator supporting a read/write head.

4. The device of claim 2 wherein the means for shielding is characterized by stripping the windage on both the upstream and downstream sides of the actuator with respect to a windage direction.

5. The device of claim 2 wherein the means for shielding is characterized by damping the disc with the stripper.

* * * * *